United States Patent [19]

Olsen

[11] Patent Number: 5,108,129
[45] Date of Patent: Apr. 28, 1992

[54] INNER FENDER LINER

[76] Inventor: Arlen B. Olsen, 2307 Spruce Pl., White Bear Lake, Minn. 55110

[21] Appl. No.: 552,915

[22] Filed: Jul. 16, 1990

[51] Int. Cl.$^5$ .............................................. B62B 9/16
[52] U.S. Cl. ..................................... 280/850; 280/851
[58] Field of Search .............. 280/848, 849, 850, 851, 280/152.2, 152.3, 154, 847, 853, 854

[56] References Cited

U.S. PATENT DOCUMENTS

| | | | |
|---|---|---|---|
| 1,930,376 | 10/1933 | Willett | 280/851 |
| 2,010,350 | 8/1935 | Davis | 280/849 |
| 2,158,813 | 5/1939 | Altmyer | 280/848 X |
| 2,634,138 | 4/1953 | Zabel | 280/849 |
| 3,341,222 | 9/1967 | Roberts | 280/851 |
| 3,776,571 | 12/1973 | Gilles et al. | 280/851 |
| 4,378,120 | 3/1983 | Laine | 280/848 X |
| 4,447,067 | 5/1984 | Yamashita | 280/848 |
| 4,687,217 | 8/1987 | Stewart | 280/848 |
| 4,927,177 | 5/1990 | Price | 280/851 |

FOREIGN PATENT DOCUMENTS

| | | | |
|---|---|---|---|
| 0999897 | 11/1976 | Canada | 280/851 |
| 3539146 | 5/1987 | Fed. Rep. of Germany | 280/851 |
| 0218477 | 12/1983 | Japan | 280/850 |
| 2172256 | 9/1986 | United Kingdom | 280/851 |

Primary Examiner—Andres Kashnikow
Assistant Examiner—Brian L. Johnson
Attorney, Agent, or Firm—James W. Miller

[57] ABSTRACT

An inner fender liner can be applied against the underside of an exposed fender for protecting the fender from damage by rocks or other objects which may be thrown up against it. The fender liner comprises a relatively thick, but flexible, sheet of plastic material shaped to cover the rear portion of the fender. The liner is bent to conform to the underside of the fender and fit flush thereagainst. At least one peripheral attachment flange, formed by a scored section of the liner, may be used to help hold the liner in place using some of the fasteners normally used to hold the fender on the vehicle.

13 Claims, 4 Drawing Sheets

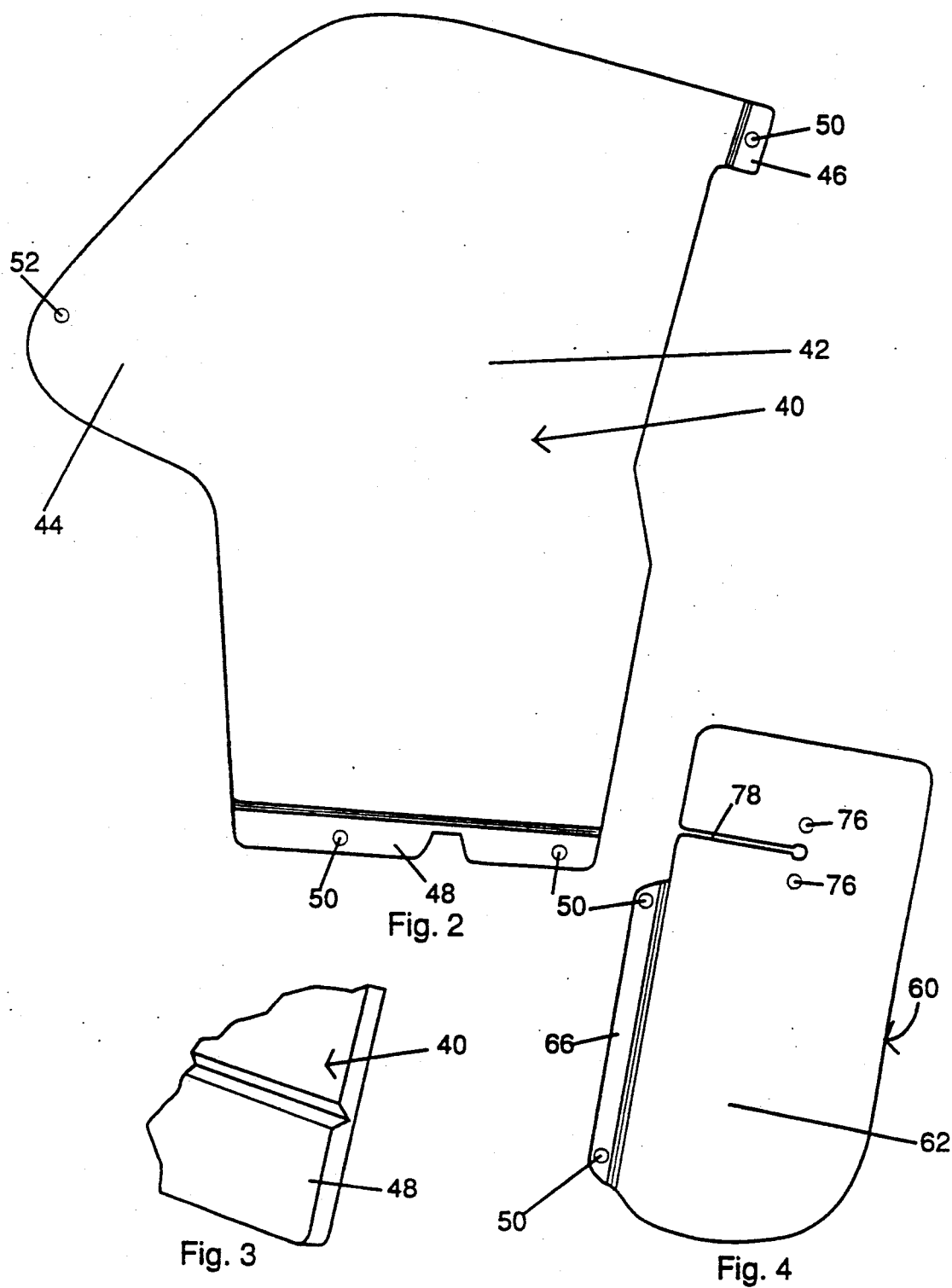

INNER FENDER LINER

TECHNICAL FIELD

The present invention relates to a fender liner which may be attached to the underside of certain vehicle fenders for protecting the fender, and particularly the painted surface on the upper side of the fender, from being damaged by rocks or other objects which are thrown up and strike the underside of the fender. The fender liner is particularly useful for the fenders of certain classic cars or street rods based on their designs.

BACKGROUND OF THE INVENTION

Antique automobiles are those which are relatively old and have been out of production for quite a long time. They are also sometimes known as classic cars. Such vehicles are relatively rare and are avidly collected. There are many different types and models of classic cars, e.g. Model T and A Fords of various vintages as well as many others.

A replacement parts industry has developed for supplying replacement parts for many of the popular classic cars. These parts are reproductions of the corresponding original equipment parts, though modern materials, such as fiberglass, are often used in their construction. In fact, it is now possible to build a replica of a classic car using only reproduction parts, albeit a car having a modern engine, suspension system, tires etc. The street rod industry has grown as a consequence allowing many popular street rods to be built based on classic car or truck designs.

The design of many classic cars, whether a true antique or a street rod, is considerably different than modern automobiles. In many classic cars, the axles basically extended out past the sides of the car so that the wheels were not enclosed within the basic body of the car, as would be true today. Separate front and rear fenders were attached to the sides of the car to enclose the wheels. A running board mounted on brackets extending out from the side of the car bridged the space between the fenders and served as a convenient step into the passenger compartment which was more elevated than in modern cars. Basically, the fenders and running boards were attachments or add-ons to the car body, rather than being integrated into the design of the rest of the car's body.

In addition, the fenders in many classic cars have certain portions which are relatively wide and flat, particularly the front fenders. While the front fenders typically have a rounded front portion surrounding the wheel, the rear half of these fenders is often quite long and wide tapering gradually downwardly to the beginning of the running board to which the rear of the fender is often attached for support. The same is often true to a lesser degree for the rear fender in these cars. The rear portion of the rear fender is less rounded than the front portion, tapering gradually downwardly to the rear bumper of the car.

As a consequence of this fender design, rocks and the like can be thrown up and strike the underside of the fender, particularly the rear and flatter portion of the fender, with some frequency as the car is driven. The impact from such objects is often sufficient to cause a cracking or "star" pattern to appear in the paint surface on the top of the fender. Needless to say, this is annoying to the owners of such vehicles, who often put relatively expensive paint jobs on these cars. When the car is primarily for show, i.e. exhibited at gatherings of classic cars or street rods, the appearance of even the slightest imperfection in the paint job, such as a starred fender, is the cause for a new, and expensive, paint job to be applied.

Various ways of protecting the underside of such fenders against starring have been tried. For example, a heavy coating of a conventional sound deadening material, i.e. a black, tar-like substance, has been applied to the underside of the fender. While this offers some protection from starring, it is very unsightly and difficult to clean. It is also relatively permanent in nature. Once applied, it is very difficult to remove.

Another approach which has been tried is to apply a sheet foam material to the underside of the fender. One side of this material is provided with a sticky adhesive to allow the material to be stuck in place. Again, while this material provides some protection, the adhesive backing no longer sticks once it is removed from the fender. Thus, it is good for only a single use. Since this type of material tends to droop over time as the adhesive backing degrades, or must be removed for show purposes or to thoroughly clean the underside of the fender, it is often necessary to periodically replace the foam material. This can become expensive and laborious since the remnants of the previously used adhesive have to be thoroughly cleaned off the underside of the fender before new sheets can be attached.

Accordingly, the prior known methods of protecting this type of fender from starring have disadvantages which render them impractical for most owners of these vehicles. Many such owners are simply deterred from using them due to their unsightly appearance and the difficulty imposed in cleaning the vehicle thoroughly when they are in place. Moreover, they can be removed once attached only with some difficulty. Accordingly, they do not address the need that has existed for a fender liner which is easy to attach, which has a clean appearance when in place and does not hang down beneath the fender, and which can be easily removed and reattached periodically for general cleaning, all while protecting the fender from starring or other damage from upwardly thrown objects striking the underside of the fender.

SUMMARY OF THE INVENTION

It is one aspect of this invention to provide an improved inner fender liner for use on fenders of certain classic car or truck designs which rectifies some of the deficiencies of prior art liners or methods.

These and other aspects of this invention are satisfied with a fender liner made from a flexible piece of material that is sufficiently thin to allow the material to be bent to conform to the underside of the fender over at least a portion of the fender and which is sufficiently thick to prevent the fender from being damaged by any upwardly thrown objects tending to strike the underside of the fender.

BRIEF DESCRIPTION OF THE DRAWINGS

The present invention will be described in more detail in the following Detailed Description, when taken in conjunction with the following drawings, in which like reference numerals refer to like elements throughout.

FIG. 2 is a plan view of a fender liner according to this invention for use on a typical front fender of the classic car shown in FIG. 1;

FIG. 3 is an enlarged perspective view of a portion of the improved fender liner shown in FIG. 2, particularly illustrating a score line in the fender liner allowing the liner to be bent;

FIG. 4 is a plan view of a fender liner according to this invention for use on a typical rear fender of the classic car shown in FIG. 1;

DETAILED DESCRIPTION

Figure 1:
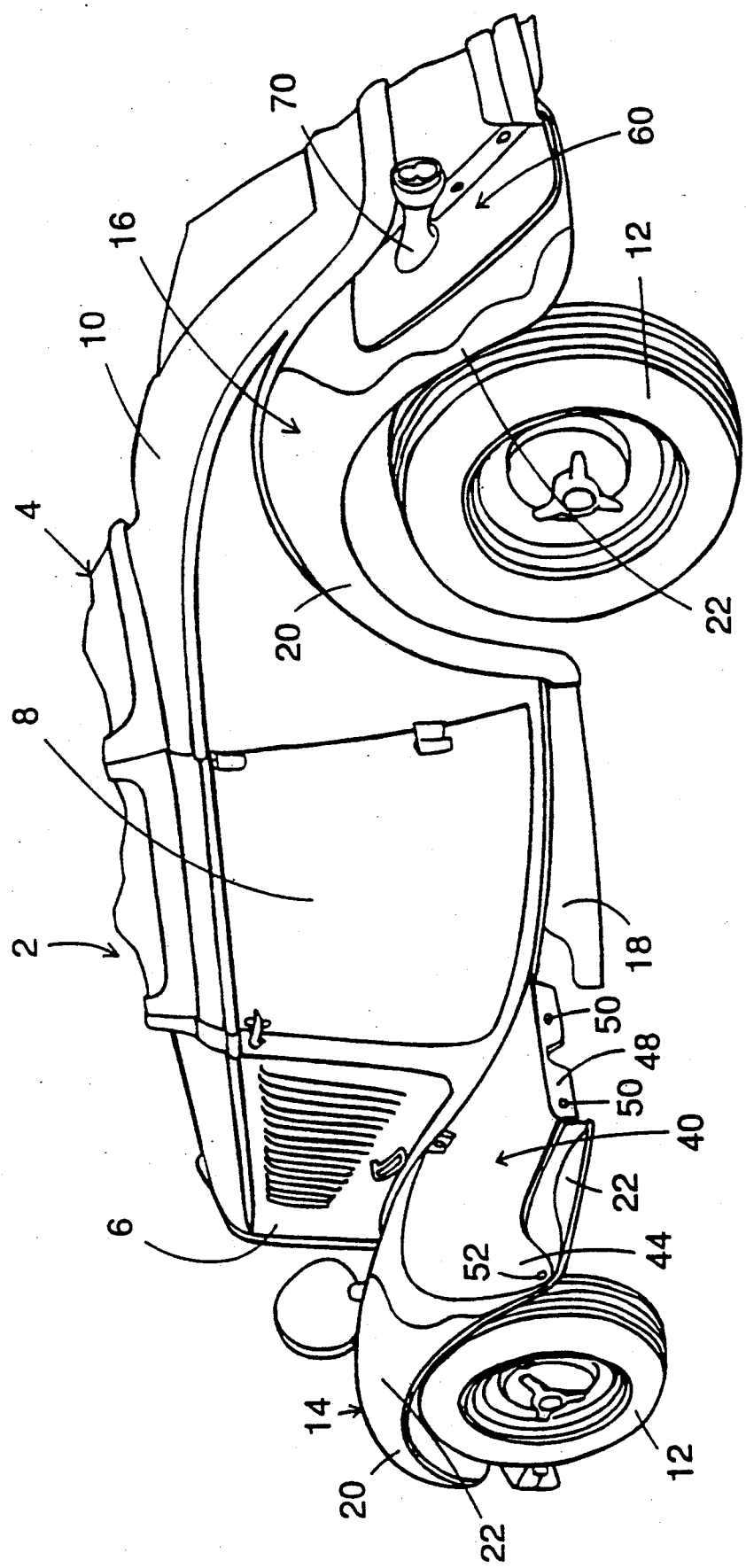
FIG. 1 is a perspective view of improved fender liners according to this invention having been applied to the front and rear fenders of a classic car of the type having fenders prone to damage from upwardly thrown rocks or other objects.
Figure 5:
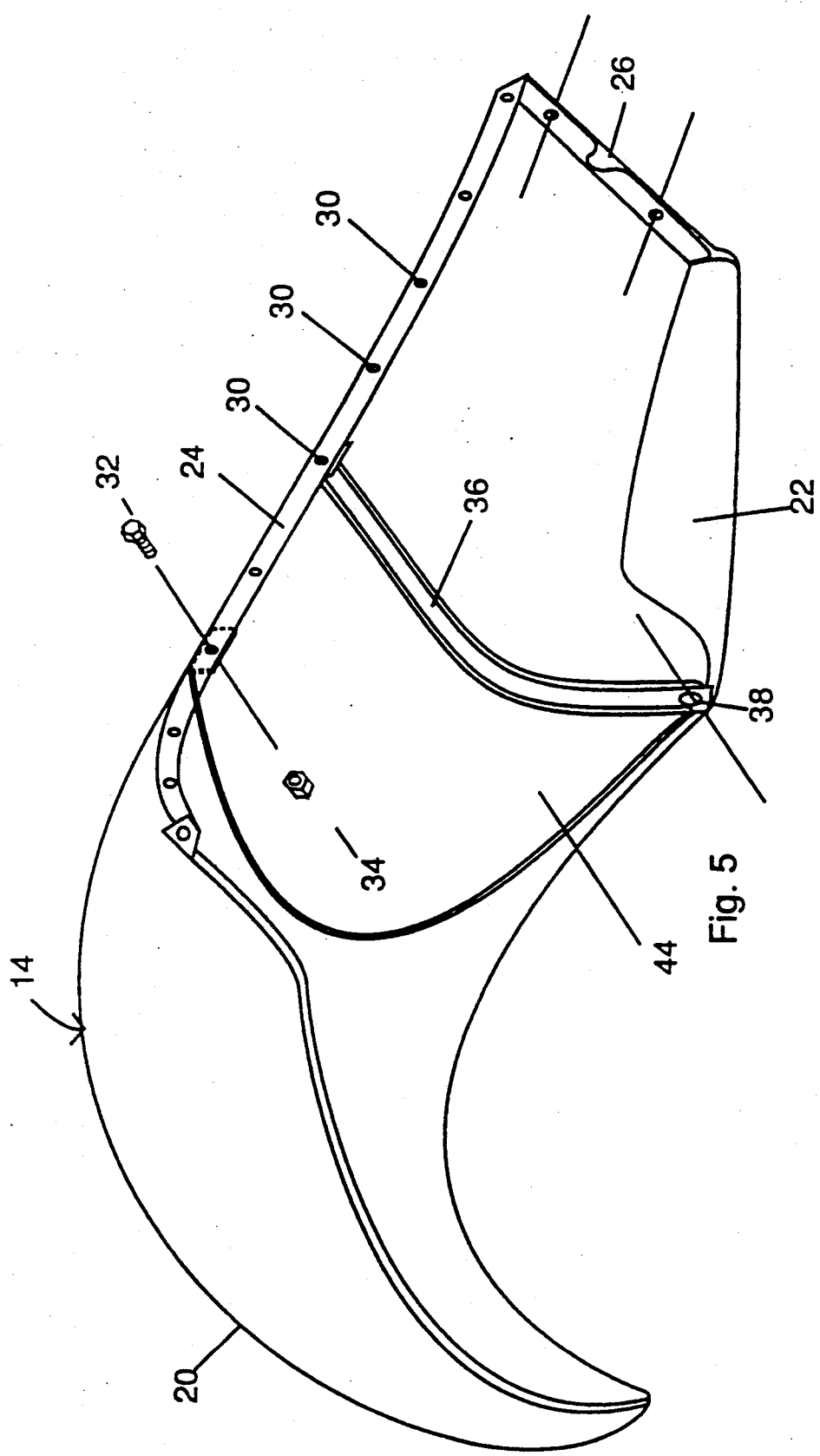
FIG. 5 is a bottom perspective view of the front fender from the classic car shown in FIG. 1, particularly illustrating the fender liner of FIG. 2 having been applied thereto.
Figure 6:
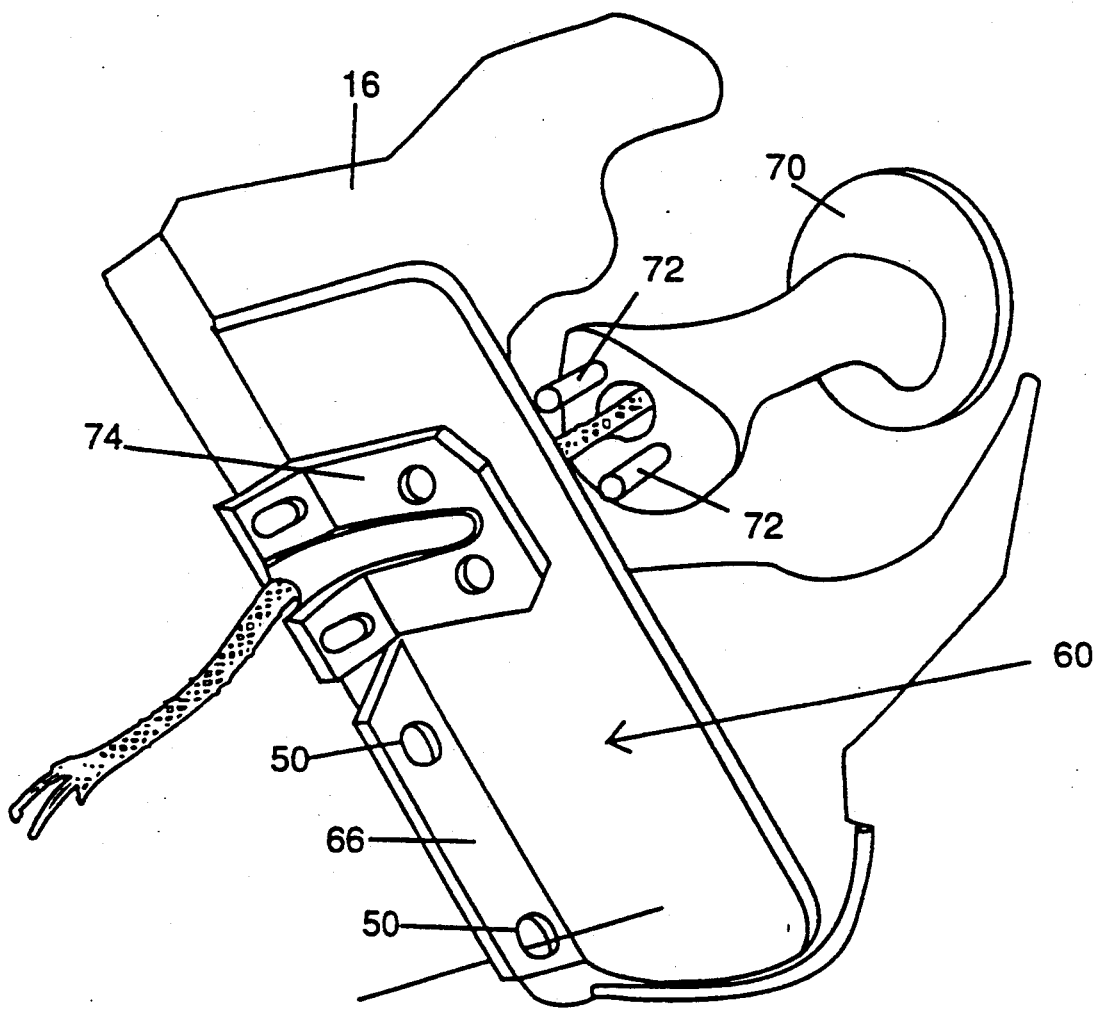
FIG. 6 is a bottom perspective view of the rear fender from the classic car shown in FIG. 1, particularly illustrating the fender liner of FIG. 2 having been applied thereto.

Referring first to FIG. 1, a classic car of the type to which the invention relates is illustrated generally as 2. Classic car 2 includes a body 4 having an engine compartment 6, a passenger compartment 8 and a trunk or rumble seat compartment 10. As is true in cars of this general type, the car's wheels 12 are on axles (not shown) which extend out past the sides of car body 4. Thus, wheels 12 are enclosed on each side of car 2 by a front fender 14 and a rear fender 16 which are attached, as will be described, to the sides of car body 4 or the frame of car 2. A horizontal running board 18 extends between front and rear fenders 14 and 16 and is attached to them in a known manner.

Classic car 2 may either be a true antique or a street rod based on the design of the car, both will have the fender and running board arrangement depicted in FIG. 1. Car 2 shown herein is a 1933-34 Ford coupe. However, many other classic cars have similar fender and running board arrangements and the present invention may be used with them. In addition, other vehicles, such as trucks, will also have fenders of the same general type under consideration here. The present invention is also usable with these vehicles as well.

Referring now to FIGS. 1 and 2, front fender 14 includes a rounded front portion 20 which relatively closely surrounds wheel 12 and a longer rear portion 22 which tapers downwardly to where running board 18 begins. The inner peripheral edges of fender 14 have downturned side and rear attachment lips 24 and 26 for helping secure or attach fender 14 to car 2. Attachment lips 24 and 26 have a plurality of holes 30 therein. A threaded fastener, such as a bolt 32, passes out from the side of the car in the case of side lip 24, or out from the front of running board 18 in the case of rear lip 26, to pass through holes 30. Nuts 34 are tightened onto bolts 32 to attach front fender 14 to both the side of car body 4 and the front of running board 18.

Front fender 14 is also braced with an L-shaped brace 36 that runs from the side of car 2 outwardly to the outer peripheral edge of fender 14 at approximately the midpoint of the fender. The inner end of brace 36 is bolted to the side of car 2 using one of the bolts 32 passing through side lip 24 of fender 14. In addition, the outer end of brace 36 is bolted to the outer peripheral edge of fender 14 at 38. Brace 36 helps support the wide and relatively flat rear portion 22 of fender 14. The basic shape of fender 14, as well as the use of downturned lips 24 and 26 and extra brace 36, is conventional for the type of classic car 2 depicted herein.

The present invention relates to an inner fender liner 40 for use on front fender 14 of classic car 2. Such a fender liner 40, shown in plan view in FIG. 2, is shaped to conform to the shape of fender 14 over its rear portion 22. Accordingly, liner 40 includes a main body portion 42 which is sufficiently long to cover the rear portion 22 of fender 14 from a point generally adjacent the back of wheel 12 to the end of fender 14 at its point of connection to running board 18. In the case of a fender liner 40 for front fender 14, an additional ear 44 branches off main body 42 and extends to one side for a purpose to be described hereafter.

Fender liner 40 is made from a sheet of relatively thick, but flexible, plastic material, preferably polyethyelene plastic. The material is thin enough so that liner 40 has some flexibility allowing it to be bent to conform to the curvatures of the underside of fender 14 and fit flush there against at least over the rear portion 22 thereof. In the case of front fender 14, liner 40 can be bent transversely, i.e. across its width, to allow it to conform to the curved outer side of fender 14 in the area covered by ear 44. The main body 42 of liner 40 is not required to curve much since it is flush against much of the flat part of rear fender portion 22. Nonetheless, liner 40 could bend somewhat transversely if portion 22 were transversely curved, or even longitudinally if portion 22 were somewhat rounded from front-to-back.

Fender liner 40 is nonetheless sufficiently thick to protect fender 14 from being damaged by rocks or other objects thrown up into engagement with the underside of the fender as car 2 is driven. Such objects are now intercepted by liner 40 and do not damage fender 14. Thus, starring or cracking of the paint job on the upper surface of fender 14, and any other types of damage which such objects can cause, are avoided. Fender liner 40 could be provided in different thicknesses, but one preferred thickness is approximately one eighth inch thick. This provides a sufficiently flexible, but sufficiently protective, liner 40.

Fender liner 40 is mounted or installed on the underside of fender 14 using the normal fastener bolts 32 used to attach fender 14 to car 2. In this regard, liner 40 is provided with scored sections 46 and 48 along its inner and rear peripheral edges which can be bent downwardly to form attachment flanges for liner 40. The score line, shown in FIG. 3, can be provided in the liner material in any suitable way, e.g. by routing or cutting a V-shaped groove therein, and extends approximately one-half of the way through the liner thickness. The score lines are required since the liner material is not sufficiently flexible to allow it to be bent over at sharp angles present at the juncture of the fender's own attachment lips 24 and 26.

A number of holes 50 are provided in the attachment flanges 46 and 48 in fender liner 40. These holes 50 are spaced to mate with some of the attachment holes 30 in fender 14. For example, two holes 50 are provided in the rear attachment flange 48 of fender liner 40 for receiving the two bolts 32 normally used at the rear of front fender 14 for securing front fender 14 to the front of running board 18. One hole 50 is provided in side flange 46 for alignment with one of the holes 30, and its corresponding bolt 32, used in attaching side lip 24 of fender 14 to car 2. Finally, an additional securing hole 52 is provided on the outer edge of ear 44 for receiving the bolt 32 used to attach fender 13 to the outer end of brace 36.

Fender liner 40 of this invention is easily attached to front fender 14. For example, with the fender in place on car 2, the nuts 34 on the four required attachment bolts 32 are first removed and the bolts 32 are pushed back out of the way into their respective holes 30. The attachment flanges 46 and 48 are then bent down along their score lines until they are generally at right angles to the rest of liner 40. This bending process can be easily done by hand without the use of tools.

The rear attachment flange 48 of liner 40 is then abutted against rear lip 26 on fender 14 and holes 50 are aligned with the two bolts 32 used to hold the fender to running board 18. These bolts 32 are then pushed back through the aligned holes and nuts 34 are replaced and tightened. Then, the side flange 46 of liner 40 is abutted against side lip 24 of fender 14 and its hole 50 aligned with the hole 30 having the loosened bolt 32. This bolt 32 is then pushed back through these aligned holes and its nut 34 is replaced and tightened. Liner 40 is then firmly pushed up into engagement with the underside of fender 14 with liner 40 bending as necessary to fit flush against the underside of fender 14. More particularly, liner 40 bends primarily in the area of ear 44 with ear 44 bending down and around the curved outer side of fender 14. Hole 52 at the outer edge of ear 44 is then aligned with the hole in the outer end of brace 36, and the loosened bolt 32 is then replaced and its nut 34 is tightened. Fender liner 40 is thus securely held in place on the underside of rear portion 22 of fender 14.

The principles of this invention will apply to similarly designed fenders even when the fender liner has to be differently shaped to fit. For example, a rear fender liner 60 as shown in FIG. 4 is designed for use on rear fender 16 of this classic car 2, again over the rear portion 22 of fender 16 extending rearwardly from wheel 12 back to the end of fender 16. This liner 60 includes a much shorter main body portion 62, without a corresponding ear, and only a single scored, side attachment flange 66. An ear is not required on liner 60 as rear fender 16 does not a have a transverse cross brace similar to brace 36 used for front fender 14. In addition, rear liner 60 does not use a rear attachment flange as the rear of fender 16 is not attached to anything corresponding to the running board.

However, the rear portion 22 of rear fender 16 does mount a tail light 70 using two threaded securing bolts 72 that pass down through a tail light bracket 74 on the underside of fender 16. Thus, the main body 62 of liner 60 includes two attachment holes 76 as shown in FIG. 4 that may be aligned with the tail light bolts 72 when liner 60 is placed between fender 16 and bracket 74. This also helps secure liner 60 in place when the nuts are replaced and tightened on bolts 72. In addition, main body 62 includes a transverse slot 78 allowing passage of the wiring to the tail light 70.

Thus, rear fender liner 60 will be secured in a manner quite similar to front liner 40. The attachment flange 66 will be formed by bending it downwardly relative to the body of the liner along the score line and the liner 66 will be lifted up into place against the underside of the rear portion 22 of fender 16. The holes 50 in the attachment flange 66 will be aligned with corresponding holes in the side lip 24 of rear fender 16 and the bolts 32 will be pushed back through the aligned holes and the nuts 34 replaced and tightened. In addition, at least for rear fender liner 60, the tail light attachment bolts 72 will also be pushed back down through the fender 16 passing through the holes 76 provided therefor in rear liner 60. The wiring to the light passes through slot 78. When the tail light fasteners are tightened on bolts 72, they will further serve to help hold rear fender liner 60 in place.

Fender liners 40 or 60 of this invention have many advantages. They neatly conform to the underside of the fender when in place and are clean in appearance. They by and large are hidden within the fender's own lips to be unobtrusive to casual inspection. Moreover, they present a smooth, clean appearance even when they are viewed by looking up from slightly beneath the fender.

Moreover, liners 40 and 60 are easy to attach and remove and can be reused many times. Thus, the owners of such cars can use these fender liners during those times when car 2 is to be driven, but they can be easily removed at other times when the appearance of car 2 is paramount, i.e. at a show. Thus, they will protect the fenders from damage during transportation to the show, but can be removed for maximum aesthetic appeal at the show, being replaced again after the show. In addition, there is nothing permanently affixed or attached to the fenders when these liners are applied, no messy tar-like substances or adhesives. Thus, there is no possibility of permanent damage or the prospect of a long cleaning process when using liners 40 or 60. All of these features substantially enhance the appeal of liners 40 or 60 to the usual owners of such vehicles, thereby helping ensure their use.

Various modifications of this invention will be apparent to those skilled in the art. The exact form and shape of the liners will vary depending on the type of and configuration of fenders to which they are applied, as can be seen by the differences depicted herein for the front and rear liners 40 and 60, respectively. In addition, the number and placement of attachment flanges and the attachment holes therein can also obviously be varied. For a front fender liner 40, it is anticipated that at least one side and one rear flange will be use, and for a rear fender liner 60 at least one side flange, but this is not crucial if the liner can be adequately held in place with fewer or differently located flanges, or by some other means, e.g. by using the fasteners typically used to hold something else on the fender as in the case of tail light bolts 72 used in conjunction with rear fender liner 60.

In addition, fender liners 40 and 60 are typically applied to the rear portions of the corresponding fenders 14 and 16 as this is the area of the fender, i.e. the flatter and wider portion, which is most prone to being starred by upwardly thrown objects. However, liners 40 and 60 could be applied to other areas of the underside of fenders 14 and 16, e.g. the front portion 20 thereof, if so desired. In this event, liners 40 and 60 might be provided in separate sections, one section for the front portion and one section for the rear portion. Thus, the scope of this invention is to be limited only by the appended claims.

I claim:

1. A fender liner for use on a vehicle fender having a painted upper surface and a lower surface that can be struck by upwardly thrown rocks to thereby cause the painted upper surface of the fender to be marred, the fender being of the type which includes a downturned inner side lip and a downturned rear lip which abut against the vehicle, the fender being secured to the vehicle by various fender fasteners passing from the vehicle through the downturned fender side and rear lips, the fender further having a brace extending transversely across the fender, the brace having an outer end secured to an outer side of the fender by a brace fastener, wherein the fender liner comprises:

a main body portion having longitudinal inner and outer sides connected together by transverse front and rear sides with the front and rear sides of the fender liner being shorter than the inner and outer sides of the fender liner so that the fender liner is longitudinally elongated, the fender liner being suited to be installed adjacent the lower surface of the fender over at least a portion thereof to intercept the upwardly thrown rocks and prevent them from marring the painted upper surface of the fender, the fender liner being sufficiently long to extend from the downturned rear lip of the fender forwardly to at least the location of the transverse fender brace, the fender liner having at least one downturned rear attachment flange on the rear side of the fender liner which is shaped to be abutted against the rear fender lip, the fender liner having at least one downturned side attachment flange on the inner side of the fender liner which is shaped to be abutted against the inner side fender lip, the outer side of the fender liner further having an outwardly extending ear located proximately to the outer end of the transverse brace when the rear attachment flange is abutted against the rear fender lip, and further including attachment means for connecting rear attachment flange to the rear fender lip, the side attachment flange to the side fender lip, and the ear to the outer end of the transverse brace for securing the fender liner to the fender.

2. A fender liner as recited in claim 1, wherein the fender liner is made from a plastic material.

3. A fender liner as recited in claim 2, wherein the fender liner is made from polyethyelene plastic material.

4. A fender liner as recited in claim 3, wherein the fender liner is between one sixteenth and one eighth inch thick.

5. A fender liner as recited in claim 1, wherein the rear attachment flange, the side attachment flange and the ear of the fender liner all have at least one hole therein, each hole in the rear and side attachment flanges being located thereon for receiving one of the fender fasteners used to secure the rear and side fender lips to the vehicle and the hole in the ear being located thereon for receiving the brace fastener used to secure the outer end of the brace to the fender, the holes and their reception of the existing fender and brace fasteners thereby serving to secure the fender liner to the fender.

6. A fender liner as recited in claim 1, wherein the rear and side attachment flanges of the liner are formed by scored sections of the liner which can be bent substantially perpendicularly to the main body portion of the liner.

7. A fender liner as recited in claim 1, wherein the liner is made from a sheet of flexible material which is sufficiently flexible to allow the liner to be bent to conform to the shape of and fit flush against the lower surface of the fender over the portion of the fender covered by the liner.

8. A fender liner for use on a vehicle fender having a painted upper surface and a lower surface that can be struck by upwardly thrown rocks to thereby cause the painted upper surface of the fender to be marred, the fender being of the type which includes a downturned lip along a peripheral edge thereof, and wherein the lip has various fasteners passing therethrough, wherein the fender liner comprises:

a main body portion having longitudinal inner and outer sides connected together by transverse front and rear sides with the front and rear sides of the fender liner being shorter than the inner and outer sides of the fender liner so that the fender liner is longitudinally elongated, the fender liner being suited to be installed adjacent the lower surface of the fender over at least a portion thereof to intercept the upwardly thrown rocks and prevent them from marring the painted upper surface of the fender, the fender liner having at least one downturned side attachment flange on one side of the fender liner which is shaped to be abutted against the fender lip, wherein the side attachment flange of the liner is formed by a scored section of the liner which is bent substantially perpendicularly to the main body portion of the liner when the liner is installed to allow the side attachment flange to abut against the fender lip, and wherein the side attachment flange has at least one hole located thereon for receiving one of the fasteners passing through the fender lip to the vehicle to thereby secure the fender liner to the fender, and wherein the fender liner further includes attachment holes in the main body portion thereof for receiving threaded fasteners used in securing an auxiliary piece of equipment to the fender.

9. A fender liner as recited in claim 8, wherein the auxiliary piece of equipment comprises a tail light.

10. A fender liner as recited in claim 8, wherein the fender liner is applied to a relatively flat portion of the fender.

11. A fender liner as recited in claim 8, wherein the fender liner is made from a plastic material.

12. A fender liner as recited in claim 11, wherein the fender liner is made from polyethyelene plastic material.

13. A fender liner as recited in claim 12, wherein the fender liner is between one sixteenth and one eighth inch thick.

* * * * *